United States Patent [19]

Brenner et al.

[11] Patent Number: 4,842,370

[45] Date of Patent: Jun. 27, 1989

[54] OPTICAL SPATIAL LOGIC ARRANGEMENT

[75] Inventors: Karl-Heinz Brenner, Nuremberg, Fed. Rep. of Germany; Alan Huang, Middletown, N.J.

[73] Assignee: American Telephone and Telegraph Company, AT&T Bell Laboratories, Murray Hill, N.J.

[21] Appl. No.: 885,550

[22] Filed: Jul. 14, 1986

[51] Int. Cl.[4] .......................... G06F 7/56; G06F 9/00; G01B 11/00; G06K 9/32

[52] U.S. Cl. .................................... 350/321; 364/713; 364/822; 382/10; 382/45; 356/388

[58] Field of Search ............................. 350/321, 96.14; 356/388, 398; 382/10, 41, 45; 364/900, 713, 822, 857

[56] References Cited

U.S. PATENT DOCUMENTS

| | | | |
|---|---|---|---|
| 3,872,293 | 3/1975 | Green | 235/181 |
| 3,903,400 | 10/1975 | Nisenson | 364/713 |
| 3,944,820 | 3/1976 | Stotts | 250/227 |
| 3,996,455 | 12/1976 | Schaefer et al. | 235/152 |
| 4,187,000 | 2/1980 | Constant | 350/162 |
| 4,418,394 | 11/1983 | Tai | 364/746 |
| 4,633,428 | 12/1986 | Byron | 350/96.14 |

OTHER PUBLICATIONS

*Journal of the Optical Society of America,* vol. 73, No. 6, 6/83, "Optical Logic Array Processor Using Shadowgrams", by J. Tanida and Y. Ichioka, pp. 800–809.

*10th International Optical Computing Conference,* 4/6/83, "Parallel Algorithms for Optical Digital Computers", by A. Huang, pp. 13–17.

*Optical Computing Technical Digest,* Winter 1985, "An Optical Processor Based on Symbolic Substitution", by K. Brenner and A. Huang.

*Applied Physics Letter,* vol. 44 (2), 1/15/84, "Use of a Single Nonlinear Fabry-Perot Etalon as Optical Logic Gates", by J. L. Jewell et al., pp. 172–174.

IEEE Journal of Quantum Electronics, QE-21, 1985, "The Quantum Well Self-Electrooptic Effect Device: Optoelectronic Bistability and Oscillation and Self-Linearized Modulation", by D. A. B. Miller et al., p. 1462.

*Primary Examiner*—John K. Corbin
*Assistant Examiner*—Ronald M. Kachmarik
*Attorney, Agent, or Firm*—Henry T. Brendzel; Jack S. Cubert

[57] ABSTRACT

An arrangement for modifying an information carrying radiant energy beam array in which occurrences of a first prescribed pattern of radiant energy beams in the array are detected by producing images of said beam array and shifting the images relative to each other responsive to a first prescribed pattern. The shifted images are superimposed and a radiant energy beam array is formed that identifies the occurrences of first prescribed patterns in the superimposed images. A plurality of images of the identifying beam array are produced and shifted relative to each other in accordance with a second prescribed pattern. The shifted images of said occurrence identifying beam array are superimposed to form the modified beam array. The modifications may comprise arithmetic processing, pattern or image processing or Turing machine type processing.

21 Claims, 7 Drawing Sheets

OPTICAL SPATIAL LOGIC ARRANGEMENT

FIELD OF THE INVENTION

Our invention relates to digital processing using radiant energy and more particularly to optical arrangements for performing spatial digital processing.

BACKGROUND OF THE INVENTION

As is well known, high speed computer and digital processing systems generally utilize arrangements of interconnected electronic devices. Advances in the field of electronics, however, have reached a stage where the inherent characteristics of electronic devices and interconnections of such devices are limiting factors. Optics is an attractive alternative to such electronic systems for very high speed processing. Systems utilizing optical arrangements to perform data functions are known in the art. U.S. Pat. No. 3,872,293, issued Mar. 18, 1975 to Eugene L. Green, discloses a multi-dimensional Fourier transform optical processor. U.S. Pat. No. 3,944,820 issued to Larry B. Stotts Mar. 16, 1976, discloses a high speed optical matrix multiplier system using analog processing techniques. U.S. Pat. No. 4,187,000, issued Feb. 5, 1980 to James N. Constant, describes an analog addressable optical computer and filter arrangement. These patents rely on analog computation techniques and are not applicable to digital processing of information.

U.S. Pat. No. 4,418,394, issued to Anthony M. Tai on Nov. 29, 1983, discloses an optical residue arithmetic computer having a programmable computation module in which optical paths are determined by electrical fields. While optical techniques are capable of very high speed operation, the required switching of electrical fields is relatively slow, and the use of such electrical field detracts from the processing speed obtainable when radiant energy is used alone.

U.S. Pat. No. 3,996,455, issued to Schaefer et al Dec. 7, 1976, discloses two-dimensional radiant energy array computers and computing devices operating in parallel on rectangular arrays of digital radiant energy optical signal elements. The logic operations on the arrays, however, are performed by various electrical, optical, electro-optical and opto-electrical devices. Consequently, the control of the Schaefer et al radiant energy computer is relatively complex.

The article "Optical Logic Array Processor Using Shadowgrams" by J. Tanida and Y. Ichioka appearing in the *Journal of the Optical Society of America,* Vol. 73, No. 6, June 1983, pp. 800–809, discloses a method of implementing digital logic gates on the basis of a lensless shadow-casting technique in which shadows cast by selectively positioned light sources are passed through prescribed masking arrangements to perform logical functions. The shadowgram arrangement utilizes precise positioning of incoherent light sources to define the logic function to be performed and specialized masking arrangements to code input information and to detect the logical output. As a result, the shadowgram technique can perform specialized optical processing but is not adapted to general purpose data processing and computing functions requiring iterations of different types of optical operations.

The articles "Parallel Algorithms for Optical Digital Computers" by A. Huang, 10*th International Optical Computing Conference, IEEE* (Cat. No. 83CH1880-4), pp. 13–17, Apr. 6, 1983, and "An Optical Processor Based on Symbolic Substitution" by K. H. Brenner and A. Huang appearing in the *Optical Computing Technical Digest,* Winter 1985, disclose digital processors in which two-dimensional input images are spatially combined with the two-dimensional output images of the processors. Rather than using Boolean type logic gating, the spatial combination is based on symbolic substitution in which patterns in an array of radiant energy beams are detected to form prescribed patterns in an output array of light beams. The radiant energy serial symbolic substitution requires manipulation of a two-dimensional cellular logic array for which an arrangement of beam serial shifting devices and controlled shutters is described. It is an object of the invention to provide improved arrangements to process radiant energy spatial digital information that may incorporate parallel processing techniques.

BRIEF SUMMARY OF THE INVENTION

The invention is directed to an arrangement for processing information in the form of radiant energy beams wherein at least one array of information carrying radiant energy beams is received. The occurrences of a first prescribed pattern of radiant energy beams in the received array are detected and the patterns of radiant energy beams in the received array are modified responsive to said occurrences.

According to one aspect of the invention, the first prescribed pattern detection includes producing a plurality of images of said generated array and shifting the images relative to each other responsive to the first prescribed pattern. The shifted images are superimposed and a radiant energy beam array is formed that identifies the occurrences of said first prescribed patterns in said generated array responsive to said superimposed images.

According to another aspect of the invention, the occurrences of the first prescribed patterns are identified by detecting a prescribed level of radiant energy at predetermined beam positions.

According to yet another aspect of the invention, modifying the identifying radiant energy information beam array comprises producing a plurality of images of the radiant energy beam array identifying the occurrences of the prescribed pattern and shifting the images of said occurrence identifying radiant energy beam array relative to each other in accordance with a second prescribed pattern. The shifted images of said occurrence identifying radiant enery beam array are superimposed to form a modified radiant energy beam array.

DETAILED DESCRIPTION

Electronic computers are generally designed to implement a form of Boolean algebra based on two states and a set of operators, e.g., AND, OR, XOR, some form of storage and inputting and outputting devices. Computation has been traditionally decomposed in logic and communication operations. Other processing techniques are known but are generally not used. One processing method particularly adapted to radiant energy, e.g., optical arrangements, is symbolic substitution which differs from the traditional approach in that processing is implemented via a mechanism in which information signals interact and are distributed at the same time. The articles "Parallel Algorithms for Optical Digital Computers" by A. Huang, *10th International Optical Computing Conference, IEEE* (Cat. No. 83CH1880-4), pp. 13–17 Apr. 6, 1983 and "An Optical Processor Based on Symbolic Substitution" by K. H. Brenner and A. Huang appearing in the *Optical Computing Technical Digest,* Winter 1985, disclose digital processors in which symbolic substitution consists of serially recognizing patterns and serially substituting other patterns responsive to the recognition. The patterns subjected to recognition may comprise a planar array of radiant energy, e.g., light beams, in which data is quantized into spots or pixels that can be on or off.

In symbolic substitution, a basic logic unit receives a spatial configuration at its input and produces another spatial configuration at its output responsive to patterns in the input spatial array. This is distinguished from Boolean logic in which an elementary logic unit receives a plurality of logic states at its input and generates a single logic state at its output. Boolean logic operates on the states of the input signals to form a single state output signal responsive to the combination of input signal states. Symbolic substitution is responsive to both the states and the positions of the input signals and is adapted to provide both state and position signals at its output. Additionally, symbolic substitution is responsive to radiant energy signals from any source in a predefined field whereas boolean logic is responsive only to signals applied to predefined inputs.

Figure 2:
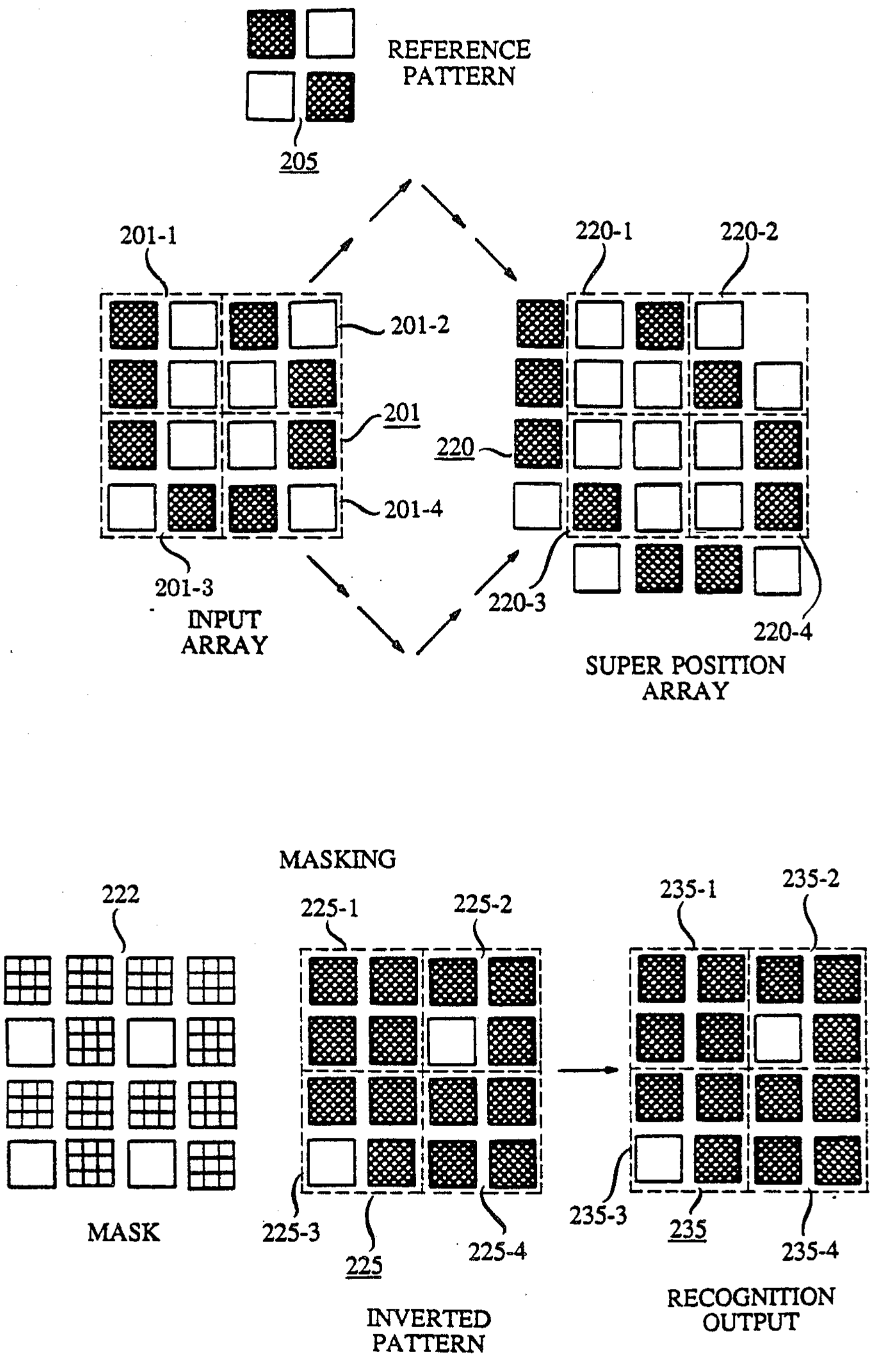
FIGS. 2 and 3 illustrate the operation of symbolic substitution logic.
Figure 3:
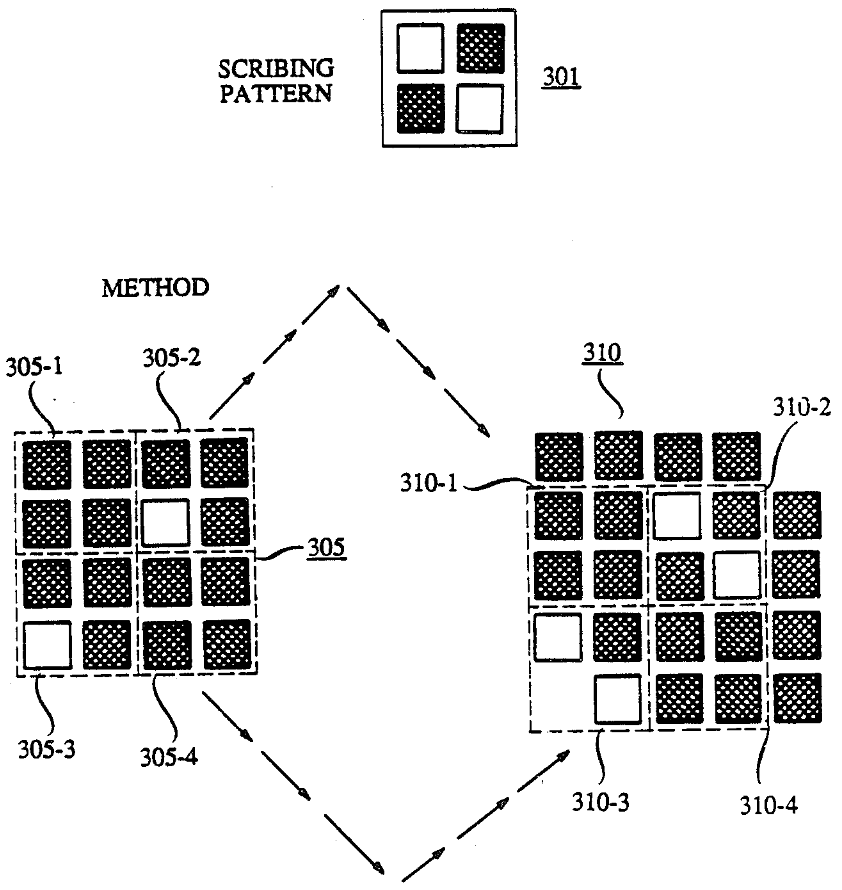

FIGS. 2 and 3 illustrate the operation of parallel symbolic substitution logic used in the invention. An input array 201 comprises a set of four-by-four spaced input beams as shown in FIG. 2. The array is viewed as incoming from a source and the elements or pixels are shown as shaded and unshaded rectangles. A shaded rectangle in the arrays of FIGS. 2 and 3 represents a dark or zero pixel and an unshaded rectangle represents a bright or one pixel. Array 201 is divided into two-by-two element patterns 201-1, 201-2, 201-3 and 201-4. The left column of pattern 201-1 has two dark pixels while the right column has two bright pixels. Sections 201-2 and 201-3 each have a dark pixel followed by a bright pixel in its left column and a bright pixel followed by a dark pixel in its right column, while pattern 201-4 has a light pixel above a dark pixel in its left column and a dark pixel above a light pixel in its right column.

Figure 1:
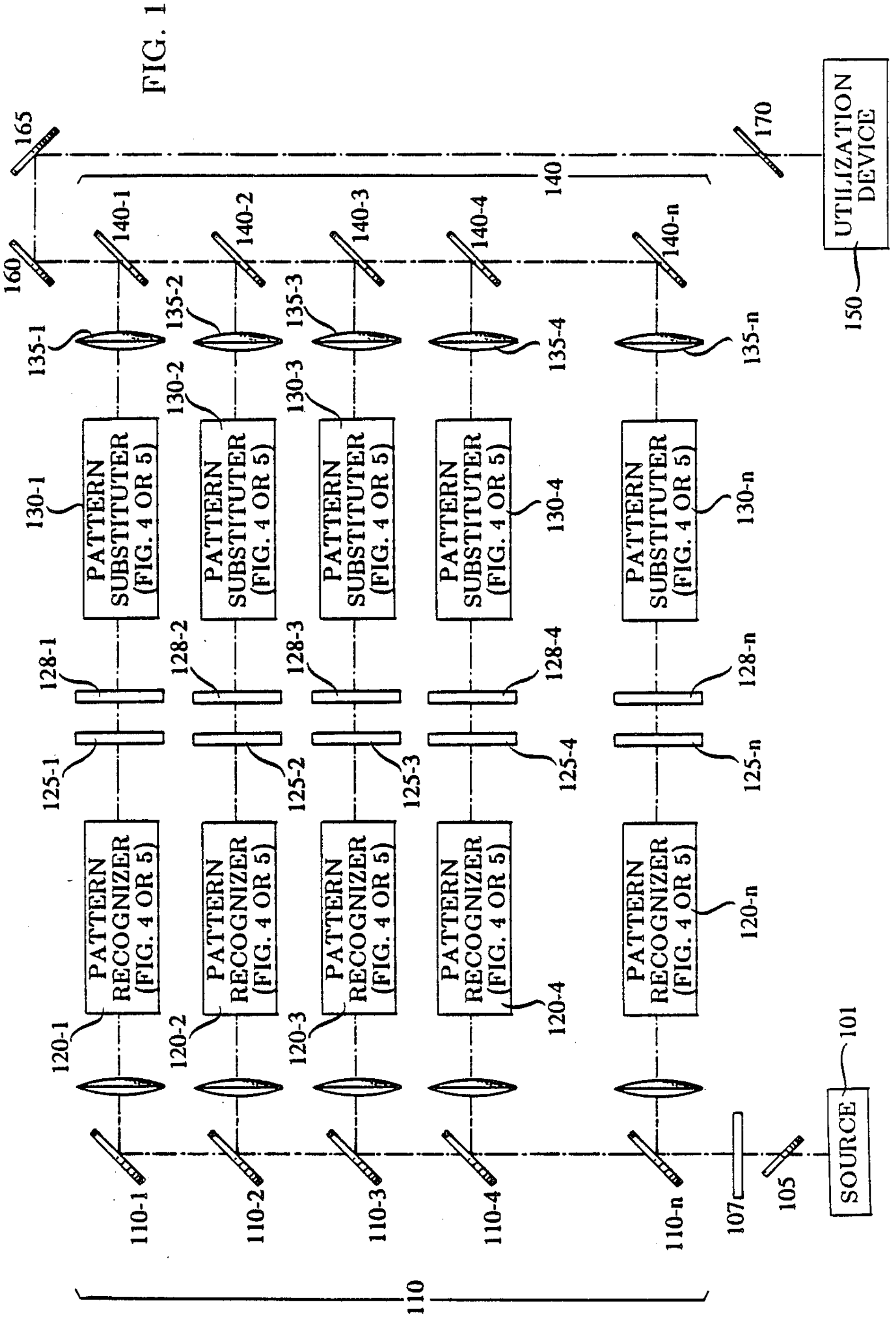
FIG. 1 depicts a general block diagram of an optical processing arrangement illustrative of the invention.

The logic system shown in FIG. 1 is arranged as will be described to detect the occurrence of two dark pixels arranged diagonally as indicated in prescribed reference pattern 205 of FIG. 2. In array 201, only patterns 201-2 and 201-3 have the diagonal dark pixel structure of reference pattern 205. Recognition of two diagonal dark pixels in a four-by-four input array in FIG. 2 is illustrative of the principles of the invention. It is to be understood that the same principles apply to any size array and in particular to reference patterns of various structures and input arrays having pixel arrangements representing symbolic, pictorial or digital information.

In order to automatically recognize sections 201-1 through 201-4 of array 201 match the dark pixel pattern of reference array 205, symbolic substitution logic in accordance with the principles of our invention, forms two copies of array 201 and implements the logic rule corresponding to prescribed pattern 205 by shifting the second copy one pixel position down and one pixel position right with respect to the first copy. The shift directions are, of course, a matter of choice to a certain extent. In this disclosure we selected shifting right and down, but other directions are certainly possible, since it is only the positioning that is important. The relatively shifted first and second copies are then superimposed to produce the superposition array 220. As shown in FIG. 2, the superimposed pattern is circumscribed by the boundary obtained by shifting the original boundary of input array 201 one pixel to the right. In accordance with the prescribed pixel movement rules, the superposition of the input array copies results in a dark pixel at the lower left pixel position sections 220-2 and 220-3. Sections 220-2 and 220-3 correspond to sections 201-2 and 201-3 of the input array which match the prescribed pattern of array 205. Superimposed array 220 has a bright pixel at the lower left cell of sections 220-1 and 220-4 corresponding to sections 201-1 and 201-4 which sections do not match the reference pattern. Recognition output array 235 is formed after passing the beams from array 220 through masking array 222 so that only the lower left pixel of each pattern of array 220 is output and then logically inverting the pixels of array 220 obtained from masking array 222. The resulting beam pattern is shown in array 225. Detection of a dark pixel at the lower left pixel position of a pattern in beam array 220 indicates the occurrence of the reference pattern in that portion of the array. To accomplish the formation of output array 235, the pixels of array 220 are masked and applied to a beam threshold type inverting device such as an optical NOR gate array. All dark pixels are replaced by bright pixels and all pixels with either one or two bright inputs are replaced by a dark pixel in the optical NOR gate array. In this way, the pattern recognition operation is substantially independent of the degree of brightness at a pixel position.

Once the light beam recognition array 235 is formed, the substitution phase of the symbolic substitution logic is performed on the masked and inverted array. In the substitution phase, a second prescribed pattern is generated to replace each section of input array 201 that matches reference pattern 205. The formation of the output array is illustrated in FIG. 3. Assume for purposes of illustration that the second prescribed or scribing pattern is one having a first column with a light pixel above a dark pixel and a second column with a dark pixel above a light pixel as in pattern 301 of FIG. 3. The formation of the substitution patterns is performed by generating first and second images of array 305 in FIG. 3 which array is the same as recognition array 235 of FIG. 2. The second image of array 305 is shifted one pixel up and one pixel to the left relative to the first image. The superposition of the first and second images of array 305 shifted in accordance with this prescribed substitution rule produces the prescribed substitution pattern in sections 310-2 and 310-3 superimposed array 310. The symbolic substitution operations on input array 305 in accordance with the prescribed recognition and substitution rules results in the formation of output array 310. All occurrences of the reference pattern 205 within input array 201 have been replaced by the scribing pattern 301 as shown in output array 310.

FIG. 1 depicts an optical processor illustrative of the invention which is adapted to perform parallel symbolic substitutions such as shown in FIGS. 2 and 3. Referring to FIG. 1, the optical processor comprises input array splitter arrangement 110 to which a two-dimensional array of radiant energy, e.g., light beams is applied from light beam source 101 via partially reflecting mirror 105 and input plane device 107. The light beam array is supplied through partially reflecting mirror 110-n and lens 112-n to the input of pattern recognizer 120-n. Similarly, the light beam array is also applied to the inputs of pattern recognizers 120-4, 120-3, 120-2, and 120-1 through partially reflecting mirrors 110-4, 110-3, 110-2 and 110-1 and associated lenses 112-4, 112-3, 112-2 and 112-1, respectively.

Each pattern recognizer 120-1 through 120-n is adapted to implement a set of prescribed rules on the input array applied thereto. The prescribed rule set for each recognizer is different from the prescribed rule set of the other recognizers. Each pattern recognizer detects the occurrences of a prescribed reference pattern in the input array. This is done by producing a plurality of copies of the input array applied to the pattern recognizer, shifting the copies relative to each other in accordance with the prescribed pattern to be recognized, and superimposing the shifted copies to form an array indicative of the locations of the detected reference patterns. Advantageously, the operations required for symbolic substitution logic are space invariant so that the shifting operations on the input array copies are fixed in each recognizer. Consequently, there are no device changes in the pattern recognizer during its operation and symbolic substitution processing may be readily performed optically at very high speeds.

Figure 4:
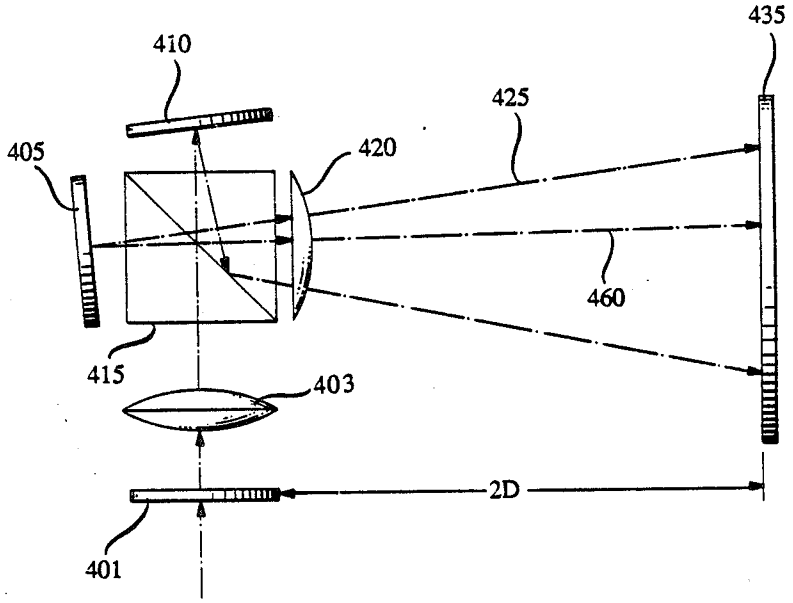
FIG. 4 shows a detailed diagram of one type of optical device useful as a pattern recognizer or pattern substituter in the block diagram of FIG. 1.

FIG. 4 show an optical device that may be used as one of the pattern recognizers, e.g., recognizer 120-1, in the processor arrangement of FIG. 1. The device comprises source element plane 401 to which a radiant energy beam such as array 201 of FIG. 2 is applied, cubic beam splitter 415, mirrors 405 and 410, lens 420, and superimposed image plane 435. Plane 401 may, for example, have a two-dimensional four-by-four binary bit array image incident thereon. Radiant energy, such as light passing through plate 401 and lens 403, enters beam splitter 415 which causes one portion of the beam to pass therethrough to mirror 410 and another portion of the beam to be deflected to mirror 405. Mirrors 405 and 410 are set at predetermined angles selected so that the beam applied to mirror 410 is deflected and the beam portion reflected therefrom is also deflected to shift the image of the beam portion applied thereto along path 430. The beam portion applied to mirror 405 is deflected therefrom to path 425. In this manner, two separate images of the input light beam array are produced. The two images are shifted relative to each other and the relatively shifted images are superimposed at superposition image plane 435.

Lenses 401 and 420 may be selected so that images on plane 435 are a convenient size. For example, these lenses and the distances in FIG. 4 may be selected to form a telescopic imaging system with unity magnification. Selection of the tilt angles of mirrors 405 and 410 is dependent on the relative shift required between the two images of the prescribed rule for the reference pattern to be recognized. The beam portion shifted by mirror 405 and the beam portion shifted by mirror 410 are directed to image plane 435 and result in superposition array of dark and bright pixels corresponding to the superimposed images at plane 435. The images may be deflected by mirrors 405 and 410 so that they are shifted an integral number of pixel positions in both the vertical and horizontal directions at image plane 435.

The pattern recognizer of FIG. 4 may be used to detect the occurrences of the dark element arrangement of reference pattern 205 in radiant energy beam array 201. Beam array 201 is supplied to beam splitter 415 via input plane 401. The beam array originates from source 101 of FIG. 1 and is applied to the recognizer input plane 401 via mirror 110-1 and lens 112-1. At first image of the beam array is directed to mirror 410 and redirected along path 430 to plane 435 via the beam splitter as previously described. A second image is applied to mirror 405 and redirected through the beam splitter along path 425 to superposition plane 435. The angles of mirrors 405 and 410 are set to shift the second image relative to the first image according to the recognition rule for the prescribed pattern of array 205. Consequently, mirror 410 shifts the first image one pixel position to the left and mirror 410 shifts the second image one pixel position down. This shifting carries out the rule corresponding to prescribed position 205. The shifted first and second images are superimposed at plane 435. A dark element detected at the lower left element of each section of the superimposed beam array indicates the presence of the reference pattern.

The shift and superposition operations result in superposition of the dark pixels of every section of the array in the lower left or reference cell if the dark pixels of the section of the array correspond to the prescribed reference pattern. Applying the rule corresponding to reference pattern 205 to beam array 201 using the arrangement of FIG. 4 results in a dark element at the lower left or reference cell of sections 220-2 and 220-3. Thus, the reference pattern occurrences are indicated by the dark lower left pixels of matching sections of the superimposed array.

As is readily seen from FIG. 4, the arrangement therein may be used to implement a particular rule adapted to recognize a prescribed reference pattern. Each pattern recognizer in FIG. 1 may be set to recognize a different reference pattern whereby complex pattern recognition can be performed. In general, every pattern recognizer is adapted to form shifted copies of the information elements in the input beam array, and to superimpose the shifted copies to produce a beam array indicative of the locations of the prescribed reference pattern. In this way, automatic recognition of occurrences of a prescribed reference pattern in the array is done with optical processing. By selectively choosing the rules controlling the array imaging shifting, relatively complex processing of binary element arrays, symbol arrays, or even arrays of picture elements may be executed at the high speeds afforded by optical devices.

Figure 5:
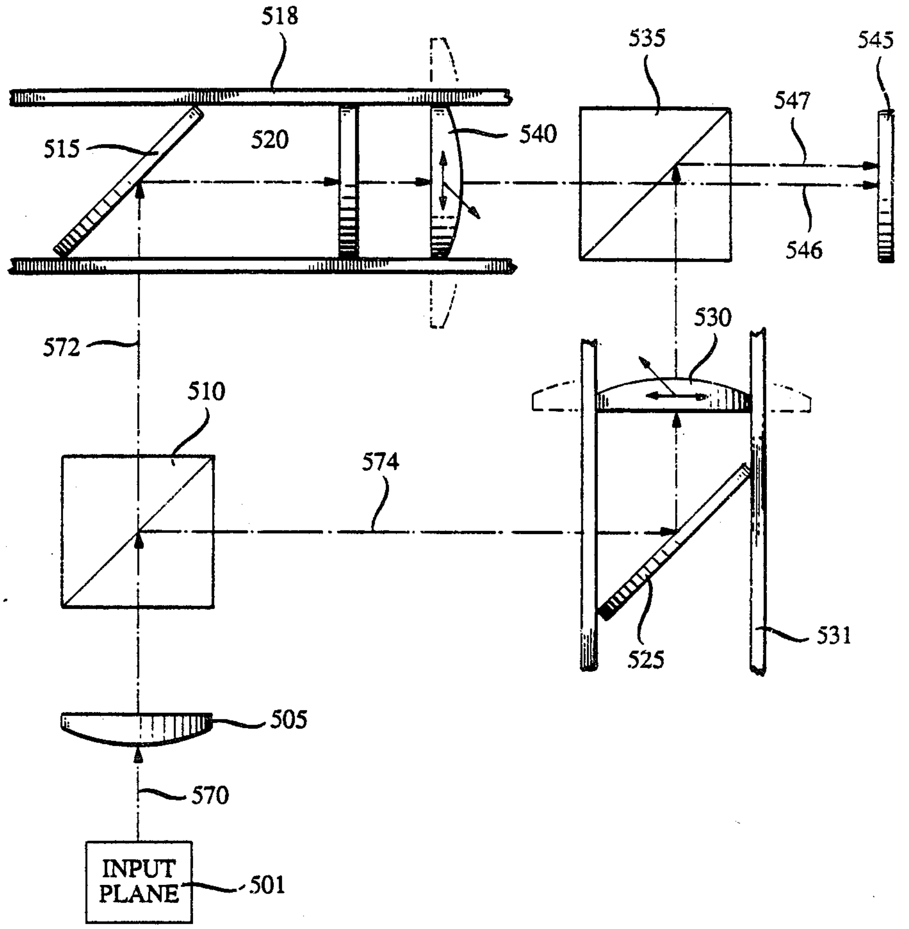
FIG. 5 shows a detailed diagram of another type of optical device useful as a pattern recognizer or pattern substituter in the block diagram of FIG. 1.

An alternative optical arrangement that may be used as the pattern recognizer of FIG. 1 is shown in FIG. 5. The optical structure of FIG. 5 includes input image plane 501 adapted to receive information bearing radiant energy beam array from one of lenses 112-1 through 112-n. The beam array may be extensive or may, for purposes of illustration, be a four-by-four pixel array 201 of FIG. 2. The beams are arranged in a predetermined grid pattern.

During a particular logic time interval, each beam in the array grid pattern may be bright or dark whereby a binary bit sequence is formed at speeds of the order of femtoseconds. The beams are thereby modulated by information elements. Each beam is polarized at a 45 degree angle. Beam array 570 is applied to a Fourier transform lens 505 which lens converts the diverging beam rays into parallel rays impinging on polarizing beam splitter 510. The vertically polarized components of beam array 572 pass through beam splitter 510, are reflected by mirror 515 and are applied to inverse Fourier transform lens 540. This inverse Fourier transform lens is adapted to focus the rays passing therethrough at a point 546 on output image plane 545. The path through lens 540 to plane 545 includes path length compensating delay 520 and polarizing beam splitter 535.

The horizontal components of the polarized beams at input image plane 501 are changed into parallel rays by Fourier transform lens 505 and the horizontally polarized parallel rays are deflected 90 degrees by polarizing beam splitter 510. These deflected rays (beam array 574) are reflected from mirror 525 and are redirected therefrom to inverse Fourier transform lens 530. Lens 530 is adapted to cause the parallel rays from a particular beam to converge to a predetermined point 547 on image plane 545 after being deflected by polarizing beam splitter 535. Lens shifter 531 to which lens 530 is rigidly connected is adapted to move the lens orthogonal to the direction of beam travel whereby the positions of the horizontally polarized beams on image plane 545 are shifted relative to the vertically polarized beams from path 572. In similar manner, lens 540 may be moved at right angles to the beam passing therethrough by lens shifter 518 so that the vertically polarized beam array is shifted relative to the horizontally polarized beam array. The displacements of lenses 530 and 540 are controlled to provide the relative beam displacements in the array images so that the superposition pattern required by the reference pattern at output plane 545 is obtained. The distance that the horizontally polarized beams travel from beam splitter 510 to beam splitter 535 including any possible beam position shift and the distance that the vertically polarized beams travel from beam splitter 510 to beam splitter 535 is equalized by optical delay 520. The delay prevents phase differences between beams 546 and 547 at plane 545.

With respect to reference pattern 205 of FIG. 2, one image is shifted down one element position and right one element position by adjusting the the position of lens 530. The location of lens 530 is adjusted by moving lens shifter 531 in the plane orthogonal to the beam travel direction whereby the selected vertical and horizontal beam position shifts are obtained in the superimposed copies at image plane 545. Alternatively, the position of lens 540 in the plane orthogonal to the beam array direction of the beam array passing therethrough may be adjusted by means of lens shifter 518 to provide vertical and horizontal shifts of the vertically polarized beam on path 572. In another arrangement, a beam displacement device in the path of the vertically polarized beam array may provide vertical shifts and the beam displacement device in the path of the horizontally polarized beam array may provide the required horizontal shifts. With respect to reference pattern 205, one image may be shifted down one element position and right one element position to provide the selected position shifts on the resulting superposition image at image plane 545. The orientation of the input beam array at plane 501 may also be adjusted to accomplish a fixed vertical shift, a fixed horizontal shift or any combination of horizontal and vertical shifts.

Such beam shifting arrangements according to the invention provide formation of two images of the beam array, the relative shifting of the images and the superposition of the relatively shifted images so that the recognition portion of the symbolic substitution logic is performed. Image plane 545 may have therein a masking pattern arranged so that only the beams at the lower left element of each section are permitted to pass to the output of the pattern recognizer. Dark pixels at these reference cell positions mark the sections that match the desired reference pattern. Alternatively, a masking pattern device may be inserted in the beam path between each recognizer and each optical gate array. For example, masking pattern device 125-1 is placed between recognizer 120-1 and optical gate array 128-1 as shown in FIG. 1. Alternatively, the optical gate array may be placed between recognizer 120-1 and masking device 125-1 so that the inversion operation precedes the masking.

The beam array output of a pattern recognizer of FIG. 1, e.g., recognizer 120-1 is sent through a masking device operative to pass the radiant energy beam from reference cell positions of the recognizer beam array. The reference cell beams are modified by optical device 128-1 wherein each dark pixel applied thereto is converted to a bright pixel and each bright pixel resulting from one or two bright inputs is converted to a dark pixel. Device 128-1 functions a light threshold device for beam inversion and may comprise an array of optical gates such as described in the article "Use of a Single Nonlinear Fabry-Perot Etalon as Optical Logic Gates", by J. L. Jewell, M. C. Rushform, and H. M. Gibbs appearing in *Applied Physics Letters*, Vol. 44(2), Jan. 15, 1984, pp. 172–174 or "The Quantum Well Self-Electrooptic Effect Device: Optoelectronic Bistability and Oscillation and Self-Linearized Modulation", by D. A. B. Miller, D. S. Chemla, T. C. Damen, T. H. Wood, C. A. Burrus, A. C. Gossard and W. Wiegmann, appearing in the *IEEE Journal of Quantum Electronics*, QE-21,page 1462, (1985). With respect to beam array 235 of FIG. 2, the lower left elements of sections 220-2 and 220-3 are dark while the lower left elements of sections 220-1 and 220-4 are bright. Consequently, the inversion operation is effective to produce beam array 305 of FIG. 3 wherein only the lower left elements of sections 305-2 and 305-3 are bright.

The apparatus of FIG. 4 or FIG. 5 may also serve as a pattern substituter. With reference to input beam array 201, array 305 has two sections (305-2 and 305-3) corresponding to sections of input beam array 201 that match the dark element pattern of reference pattern 205. Array 305 is applied from optical device 128-1 to pattern substituter 130-1. First and second copies of beam array 305 are produced by the beam splitter arrangement of FIG. 4 in accordance with the rules corresponding to the formation of reference pattern 301. In the beam splitter, the first and second copies are displaced by the angling mirrors 405 and 410 so that one copy is shifted one element up and the other copy is shifted one element to the right. The shifted copies are superimposed at output plane 435 whereby the superposition array 310 is formed.

In the event the arrangement of FIG. 5 is utilized as a pattern substituter, lens 530 and lens 540 are positioned by devices 531 and 518 to achieve the one element up and one element right shift. The pattern substituter operation results in a superposition array in which sections 310-2 and 310-3 correspond to reference pattern 301 and sections 310-1 and 310-4 have all dark elements.

Using either the structure of FIG. 4 or FIG. 5, only pattern recognizer 120-1 and corresponding pattern substituter 130-1 are utilized to detect the occurrences of the two dark beams of reference pattern 205 and to substitute the two bright beams of reference pattern 301. The other pattern recognizer and pattern substituter sets of FIG. 1 may be used to provide recognition and substitution of other patterns that may be present in sections 201-1 and 201-4. The plurality of substituted patterns are then combined into a single beam array by combining mirrors 140-1 through 140-n of FIG. 1. The beam output of substituter 130-n passes through lens 135-n and is deflected from mirror 140-n to mirror 160 through partially reflecting mirrors 140-4, 140-3, 140-2, and 140-1. The beam outputs of substituters 130-4, 130-3, 130-2 and 130-1 are directed to mirror 160 via partially reflecting mirrors 140-4 through 140-1 and lens 143 as shown in FIG. 1. Consequently, the beam arrays from the substituters are superimposed and combined into a single beam array at mirror 160. This single beam array is directed to utilization device 150 via mirror 165 and through mirror 170 and may be redirected to the logic arrangement input through mirror 105. The combining mirror structure of mirrors 140-1 through 140-n, 160, 165, and 170 are located so that the beam arrays through each recognizer substituter combination travel the same distance through the logic arrangement. Mirrors 170 and 105 may be of the partially reflecting type so that the beam array incident thereon may be looped from the logic arrangement output to its input, directed from source 101 into the logic arrangement or sent to utilization device 150. In accordance with the invention, one or more reference patterns in a radiant energy beam array are detected in parallel and prescribed patterns substituted in parallel.

Figure 6:
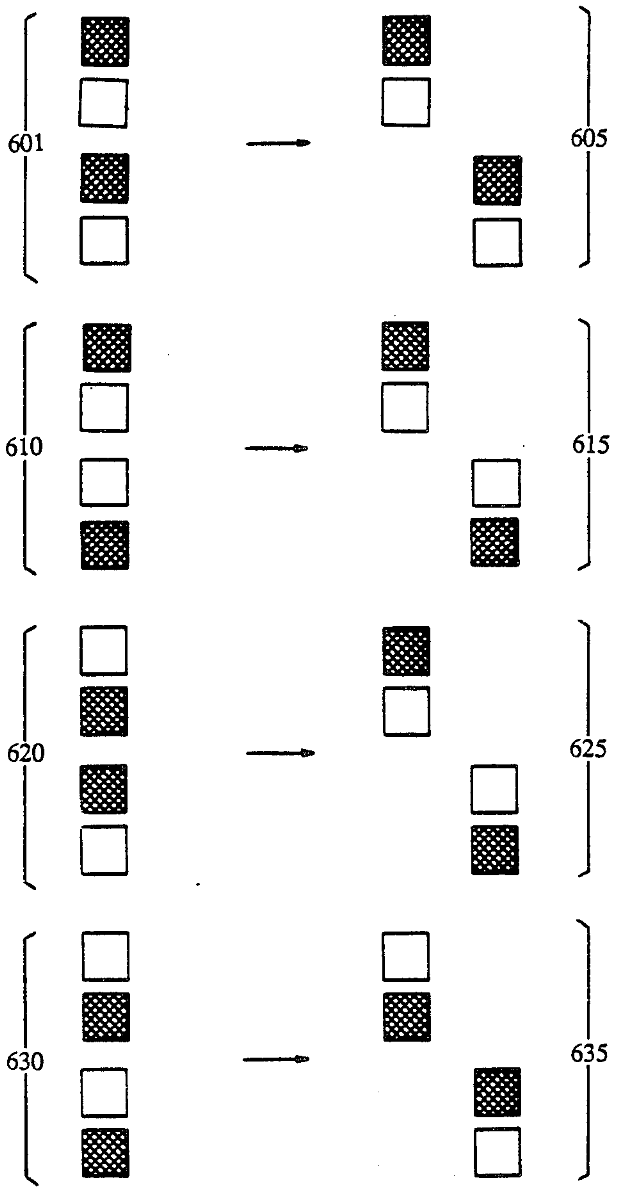
FIG. 6 illustrates the rules of symbolic substitution logic for binary addition.

As is well known in the art, all binary arithmetic can be implemented from binary addition, shifting and complementing. The processor of FIG. 1 is adapted to perform such binary arithmetic based on the symbolic substitution rules illustrated in FIG. 6. Referring to FIG. 6, each binary number is represented by a 1-0 pattern or a 0-1 pattern in dual-rail logic. For purposes of illustration, it is assumed that the apparatus of FIG. 1 is used to perform binary addition of two multi-bit numbers 5=0101 and 13=1101. In dual-rail logic for symbolic substitution, these numbers may be coded into an input light beam array pattern as

| |
|---|
| 0101 |
| 1010 |
| 1101 |
| 0010 |
| 0010 |

The first two rows represent one input number (5) and the second two rows represent the other input number (13) in dual-rail notation. The rules for binary addition in symbolic substitution logic are listed in Table 1.

TABLE I

| | |
|---|---|
| 0 0 | 0 0 |
| 1 → 1 | 1 → 1 |
| 0 0 | 1 1 |
| 1 1 | 0 0 |
| Rule 1: (0,0) → (0,0) | Rule 2: (0,1) → (0,1) |
| 1 0 | 1 1 |
| 0 → 1 | 0 → 0 |
| 0 1 | 1 0 |
| 1 0 | 0 1 |
| Rule 3: (1,0) → (0,1) | Rule 4: (1,1) → (1,0) |

Each rule includes detection of an occurrence of a column of four pixels indicated in the left side column of the rule and substitution by a two column pattern indicated to the right. The lower two rows of the right side of the rule represent the result in that column and the left shifted upper two rows of the right side of the rule represents the carry to the next higher order column. The upper half of the result column is blank to accommodate any possible carry of the next lower order column. FIG. 6 illustrates the radiant energy beam patterns for the rules of Table 1. Beam patterns 601 and 605 correspond to rule 1 for adding a binary zero to a binary zero. Single column pattern 601 is a dual rail representation of the two input zeros as a 01 above as a 01. Recognition of pattern 601 results in the formation of two column pattern 605. The sum is placed in the same column as in pattern 601 and the carry beam is shifted left to the next higher order column. Similarly, rules 2, 3, and 4 of Table 1 are implemented in dual-rail radiant beam logic as shown in patterns 610 and 615, 620 and 625 and 630 and 635, respectively.

In the apparatus of FIG. 1, each pattern recognizer and its associated pattern substituter is arranged to implement one rule of Table 1. Recognizer 120-1 and substituter 130-1 may be adapted to carry out the (0,0)→(0,0) rule. The (0,1)→(1,0) rule may be assigned to recognizer 120-2 and substituter 130-2. The (1,0)→(1,0) rule may be assigned to recognizer 120-3 and substituter 130-3 while recognizer 120-4 and substituter 130-4 may be adapted to implement the (1,1)→(0,1) rule. Each recognizer receives a copy of input radiant energy or light beam array 601 show in FIG. 6.

Using the optical arrangement of FIG. 5 in recognizer 120-1, shifters 518 and 531 are positioned to shift the images on paths 572 and 574 relative to each other to perform the recognition of the (0,0)→(0,0) rule. In particular, lens 530 is positioned by shifter 531 so that the image of input beam array 601 along path 574 is shifted three beam positions down at output image plane 545 and the image on path 572 is shifted one position down. In this way, the dark beam of the upper binary input is superimposed on the dark beam of the lower binary bit input at superposition plane in the lowermost position of pattern 601. To implement rule 2 in recognizer 120-2, lens 530 is positioned to shift the image of pattern 610 on path 574 three beam element positions down at plane 545 while lens 540 is positioned so that the image of pattern 610 on path 572 remains unshifted. As a result the dark beams of both inputs are superimposed at plane 545 in the lowermost or reference cell position of pattern 610. For rule 3, pattern recognizer 120-3 is arranged whereby the image of pattern 620 on path 572 is shifted two beam positions down by adjusting the position lens 540 while the image of pattern 620 on path 574 is shifted one position down by appropriate positioning of lens 530. Rule 4 is carried out in the optical apparatus of FIG. 5 by arranging lens 540 to shift the image on path 572 two beam element positions down at output image plane 545 and setting lens 530 so that the image on path 574 remains unshifted. In this way, both binary input dark elements are superimposed at the output plane in the lowermost position of pattern 630.

As aforementioned, output plane 545 of each pattern recognizer supplies a beam array which indicates the occurrences of prescribed pattern by the state of the beam element in the reference cells of the array e.g., the lowermost position of each column. A dark element in the reference cells is applied to the corresponding optical logic gate inverter via a reference cell masking device. In the binary adder arrangement, the reference cell is the lowermost cell of each column. If a column of the input array matches a prescribed pattern of column patterns 601, 610, 620 and 630, the lowermost position of the corresponding pattern recognizer is a dark pixel. For example, if a column section of an input array matches that of column pattern 601, the lowermost position of the resulting column array at masking plane 545 of the column is a dark beam. The other possible input array column pixel configurations result in a bright element at this lowermost position.

The optical gate array for each recognizer is operative to invert the reference cell position pixels of the array through the corresponding optical mask to provide a pattern occurrence array at the input of the corresponding pattern substituter. The substituter in turn is responsive to the pattern occurrence indicative array to generate an output pattern that corresponds to the binary addition rule performed by the recognizer substituter combination. The outputs of all substituters are combined to form the result beam array of the addition.

As an example of substituter operation, consider the arrangement of FIG. 5 adapted to be substituter 130-1. A column pattern of a bright element below three dark elements corresponding to detection of the occurrence of pattern 601 may be received at input plane 501 of substituter 130-1 from mask 125-1 and inverter 128-1. The image of the occurrence pattern on path 572 is undeflected while the image of the occurrence pattern on path 574 is displaced by lens 530 so that the bright element at the bottom of the occurrence detection pattern is shifted two element positions up and one element position to the left. This shift results in the two columns of pattern 605.

In the event a pattern other than that of pattern 601 is applied to pattern recognizer 120-1, the occurrence array from mask 125-1 and inverter 128-1 applies an all dark beam element column to substituter 130-1. Consequently, only an all dark output pattern appears on the output of substituter 130-1. Pattern substituters 130-2, 130-3 and 130-4 operate in similar fashion to implement the rules (0,1)→(1,0), (1,0)→(1,0) and (1,1)→(0,1), respectively. In substituters 130-2 and 130-3, the image on path 574 is shifted one position up while the image on path 572 is shifted two positions up and one position left. Substituter 130-4 is operative to shift the image on path 574 three positions up and one position left while the image on path 572 is unshifted.

Figure 7:
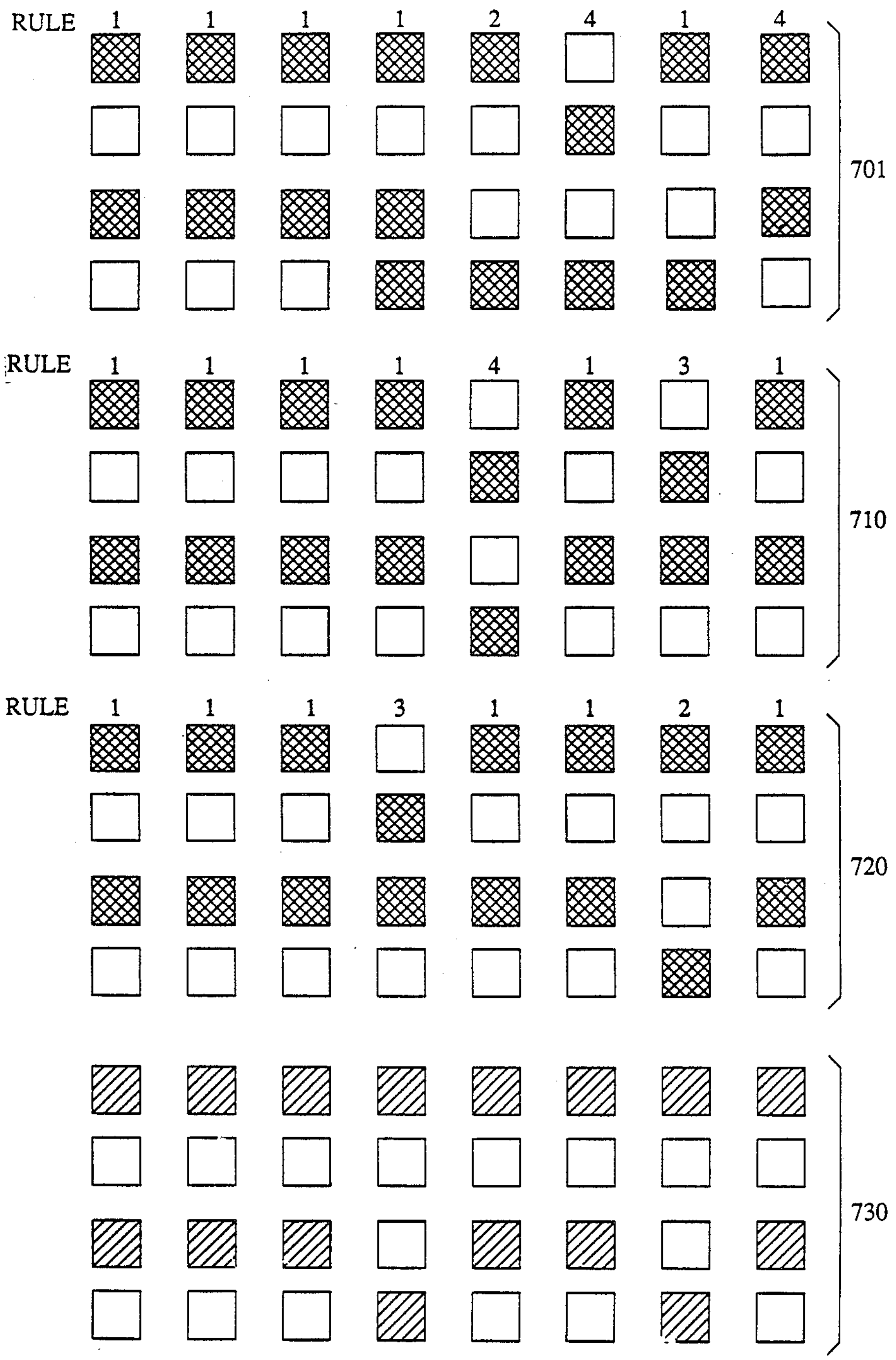
FIG. 7 shows optical beam patterns illustrating the use of the block diagram of FIG. 1 as a binary adder.

FIG. 7 illustrates the binary addition of the aforementioned numbers 0101 and 1101. The dual-rail radiant energy beam pattern for these input binary numbers is shown in array 701. The upper two rows represent the number 0101 and the lower two rows represent the number 1101. Array 701 from source 101 of FIG. 1 is applied to pattern recognizers 120-1, 120-2, 120-3, and 120-4 through beam spliters 110-1 through 110-4 as previously described. Recognizer 120-1 is set to implement recognition of the (0,0) pattern of rule 1. Recognizer 120-2 is adapted to detect the occurrence of the (0,1) pattern of rule 2. Recognizer 120-3 performs the recognition of the (1,0) pattern of rule 3 and recognizer 120-4 implements the recognition of the (1,1) pattern of rule 4. As indicated in array 701, the pattern of rule 1 is detected in array columns 1–4 and 7, the pattern of rule 2 is recognized in array column 5, and the pattern of rule 4 is detected in columns 6 and 8 of the array.

Substituter 130-1 receives a bright beam in the lowermost pixel position of array columns 1–4 and 7 and produces pattern 605 of FIG. 6. In like manner, substituted 130-2 receives a bright beam in the lowermost (reference) cell of column 5 and produces pattern 615. Substituter 130-3 receives a bright beam at none of the reference cells, and substituter 130-4 receives a bright beam in reference cells 6 and 8 and emits pattern 635. The output arrays from substituters 130-1 through 130-4 are redirected in pattern combiner 140 to produce array 710 in accordance with the symbolic substitution binary arithmetic rules of FIG. 6.

Array 710 is reflected from mirrors 170 and 105 to reenter pattern splitter 110 and is transformed by the pattern recognizers, inverters, masks and substituters of FIG. 1 into beam array 720 at the output of pattern combiner 140. Columns 1–4, 6 and 8 of array 710 are detected as rule 1 patterns in recognizer 120-1. Column 5 pattern is detected as a rule 4 pattern in recognizer 120-4 and the column 7 pattern is detected as a rule 3 pattern in recognizer 120-3. The outputs of recognizers 120-1 through 120-4 are supplied through mask 125 and gate array 128 to substituters 130-1 through 130-4. Array 720 is produced by combining the output beam arrays of these substituters which operate according to the substitution rules of FIG. 6.

Beam array 720 is redirected to beam splitters 110-1 through 110-4 via mirrors 145 and 105. The processing of array 720 according to the rules illustrated in FIG. 6 results in the beam array illustrated in array 730. Array 730 is reapplied to the input beam splitters of FIG. 1 so that the final carry position may be formed. In the illustrative example, however, there is no change in the most significant column so that array 740 is the same as array 730. Array 740 is obtained after four iterations and consists of zero codes in all upper two rows and the sum result 00010010 in the lower two rows.

The invention has been illustrated and described with reference to particular embodiments thereof. It is to be understood, however, that various changes and modifications may be made by those skilled in the art without departing from the spirit and scope of the invention. The invention provides an arrangement for performing symbolic substitution to implement two-dimension circuits with constant fan-in and constant fan-out and space invariant interconnections. While the use of the invention in performing binary arithmetic has been described, the invention may be applied to many other computation that can be decomposed into symbolic transformations implementable via symbolic substitution such as Boolean algebra, pattern generators, pattern recognizers and Turing machines.

What is claimed is:

1. Apparatus for processing information residing in the energy pattern of radiant energy beams comprising:

means for receiving at least one array of information-carrying radiant energy beams where said information, representing a first or a second logic level, is expressed in the spatial pattern of said array;

means responsive to each received array for detecting occurrences of a prescribed pattern of radiant energy beams in said received array;

means responsive to each occurrence of said prescribed pattern in said received array for modifying the radiant energy beams therein; and means for combining the modified radiant energy beam array from said radiant energy beams modifying means with other information-carrying radiant energy beam arrays.

2. Apparatus for processing information residing in the energy pattern of radiant energy beams comprising:

means for receiving an array of information-carrying radiant energy beams where said information, representing a first or a second logic level, is expressed in the spatial pattern of said array;

means responsive to said received array for generating a plurality of information-carrying radiant energy beam arrays corresponding to said received array;

means responsive to each generated array for detecting occurrences of a prescribed pattern of radiant energy beams in said generated array;

means responsive to each occurrence of said prescribed pattern in said generated array for modifying the radiant energy beams in said generated array;

and means for combining the modified radiant energy beam arrays from said plurality of prescribed pattern modifying means.

3. Apparatus for processing information in the form of radiant energy beams according to claim 2 wherein each prescribed pattern detecting means comprises:

means responsive to said generated array for producing a plurality of images thereof;

means responsive to said prescribed pattern for displacing at least one of said plurality of images relative to the other of said plurality of images;

means for superimposing said relatively displaced images; and means responsive to said superimposed relatively displaced images for forming a third radiant energy beam array identifying the occurrences of said prescribed pattern in said generated array.

4. Apparatus for processing information in the form of radiant energy beams according to claim 3 wherein:

said means for producing said plurality of images comprises means responsive to said generated array for producing at least first and second images of said generated array;

said image displacing means comprises means responsive to said prescribed pattern for displacing the second image relative to said first image;

said superimposing means comprises means for superimposing said relatively displaced first and second images; and said third radiant energy beam array forming means comprises means responsive to said superimposed relatively displaced first and second images for forming said third radiant energy beam array identifying the occurrences of said prescribed pattern in said generated array.

5. Apparatus for processing information in the form of radiant energy beams according to claim 3 wherein said radiant energy beam array modifying means comprises:

means responsive to said third radiant energy beam array identifying the occurrences of the prescribed pattern for producing a plurality of images of said third radiant energy beam array;

means for shifting at least one of said plurality of images of said third radiant energy beam array relative to the formed third radiant energy beam array; and means for superimposing the shifted and unshifted images of said third radiant energy beam array to form said modified radiant energy beam array.

6. Apparatus for processing information in the form of radiant energy beams according to claim 5 wherein:

said means for producing a plurality of images comprises means responsive to said third radiant energy beam array identifying the occurrences of the prescribed pattern for producing at least first and second images of said third radiant energy beam array;

said shifting means comprises means for shifting at least one of said first and second images of said third radiant energy beam array relative to the formed third radiant energy beam array; and said superimposing means comprises means for superimposing the first and shifted second images of said third radiant energy beam array to form said modified radiant energy beam array.

7. Apparatus for processing information in the form of radiant energy beams according to claim 4 or claim 6 wherein:

the first and second image producing means of said prescribed pattern detection means comprises means for directing said first image of said generated array along a first distinct path and said second image of said generated array along a second distinct path; and said image shifting means of said prescribed pattern detecting means comprises means for altering said second distinct path relative to said first distinct path.

8. Apparatus for processing information in the form of radiant energy beams according to claim 7 wherein:

said first and second image directing means comprises a beam splitting means for redirecting a first portion of the generated array along said first distinct path and for redirecting a second portion of the generated array along said second distinct path; and said distinct path altering means comprises means responsive to said prescribed pattern for modifying at least one of said first and second distinct paths to displace said second generated array portion a predetermined number of beam array positions relative to said first generated array portion.

9. Apparatus for processing information in the form of radiant energy beams according to claim 8 wherein:

said distinct path modifying means comprises at least one displacing means positioned according to said first prescribed pattern to shift said second distinct path relative to said first distinct path.

10. Apparatus for processing information in the form of radiant energy beams according to claim 6 wherein:

the first and second image producing means of said radiant energy beam array modifying means comprises means for directing said first image of said third radiant energy beam array along a first distinct path and said second iamge of said third radiant energy beam array along a second distinct path; and said shifting means of said radiant energy beam array modifying means comprises means for altering at least one of said first and second distinct paths.

11. Apparatus for processing information in the form of radiant energy beams according to claim 10 wherein:

said first and second image directing means comprises beam splitting means for redirecting a portion of the third radiant energy beam array along said first distinct path and a second portion of the third radiant energy beam array along said second distinct path; and said path altering means of said radiant energy beam array modifying means comprises means for modifying said at least one of said first and second distinct paths to displace at least one of said first and second generated portions of said third radiant energy beam array a predetermined number of array beam positions.

12. Apparatus for processing information in the form of radiant energy beams according to claim 11 further comprising:

means for defining a second prescribed pattern; and wherein said distinct path modifying means comprises at least one beam displacing means positioned according to said second prescribed pattern to shift at least one of said first and second distinct paths.

13. Apparatus for processing information in the form of radiant energy beams according to claim 12 wherein:

said beam displacing means is positioned according to said second prescribed pattern to shift its distinct path whereby said second prescribed pattern is generated for each occurrence of said first prescribed pattern in said generated array.

14. Apparatus for processing information in the form of light beams comprising:

source means for producing an array of information bearing light beams each having either a high light intensity or a low light intensity and together by virtue of the pattern of light intensities representing either a first logic level or a second logic level;

means for splitting the light beam array from said source means into a plurality of input light beam arrays corresponding to said source means light beam array;

means responsive to each input light beam array for generating an occurrence-identifying array that identifies occurrences of a first prescribed pattern in said light beam array;

means responsive to said occurrence identifying array for generating a second light beam array having a second prescribed pattern substituted for each first prescribed pattern in said input light beam array; and means for combining said second light beam arrays into a common light beam array.

15. Apparatus for processing information in the form of light beams according to claim 14 wherein said occurrence identifying array generating means comprises:

means responsive to said input light beam array for forming a plurality of copies thereof;

means for directing each copy of said input light beam array along a distinct path;

means responsive to said first prescribed pattern for modifying said at least one of said distinct paths to shift said at least one input light beam array copy relative to the other light beam array copies; and means for superimposing said plurality input light beam array copies from said modified and unmodified distinct paths.

16. Apparatus for processing information in the form of light beams according to claim 15 wherein:

said copy forming means comprises means responsive to said input light beam array for forming at least first and second copies thereof;

said input light beam array copy directing means comprises means for directing said first input light beam array copy along a first distinct path and directing said second light beam array copy along a second distinct path;

said distinct path modifying means comprises means responsive to said first prescribed pattern for modifying said at least one of said first and second distinct paths to shift said at least one input light beam array copy relative to the second light beam array copy; and said superimposing means comprises means for superimposing said first and second input light beam array copies from said distinct paths.

17. Apparatus for processing information in the form of light beams according to claim 16 wherein said occurrence identifying array generating means further comprises:

means for inverting the light beams of the superimposed first and second light beam array copies;

and means responsive to said inverted superimposed light beam array copies for forming said occurrence identifying array.

18. Apparatus for processing information in the form of light beams according to claim 17 wherein said second light beam array generating means comprises:

means for separating said occurrence identifying light beam array into first and second copies thereof;

means for directing said first occurrence identifying light beam array copy along a first distinct path and said second occurrence identifying light beam array copy along a second distinct path;

means responsive to said second prescribed pattern for modifying said first and second distinct paths to shift at least one of said first and second occurrence identifying light beam array copies; and means for superimposing said said first and second occurrence identifying light beam copies from said modified first and second distinct paths.

19. Apparatus for processing information in the form of light beams according to claim 18 wherein said means for combining said second light beam arrays into a common light beam array comprises means for redirecting each second light beam array to a common path along which the second light beam arrays are superimposed.

20. Apparatus for processing an array of information carrying radiant energy beams comprising:

means for defining a prescribed beam pattern within a radiant energy beam array;

means responsive to said radiant energy beam array for detecting occurrences of said prescribed pattern of radiant energy beams therein; and means responsive to each detected occurrence of said prescribed pattern in said array for modifying the radiant energy beams in said detected prescribed pattern of the array;

said detecting means comprising:

means for generating a plurality of images of said radiant energy beam array;

means responsive to said prescribed pattern for displacing said images relative to each other;

means for superimposing said relatively displaced images; and means responsive to said superimposed relatively displaced images for forming a radiant energy beam array identifying the occurrences of said prescribed pattern.

21. Apparatus for processing an array of information carrying radiant energy beams according to claim 20 wherein said means for modifying the radiant energy beams in said prescribed pattern of the array comprises:

means responsive to said radiant energy beam array identifying the occurrences of the prescribed pattern for producing a plurality of images of said identifying radiant energy beam array;

means for displacing at least one of said plurality of images of said identifying radiant energy beam array relative to the other of said plurality of images of said identifying radiant energy beam array; and means for superimposing the displaced and other images of said identifying radial energy beam array to form said modified radiant energy beam array.

* * * * *